Aug. 14, 1934.   H. EWING ET AL   1,970,292
FIBER TESTING APPARATUS
Filed July 27, 1929
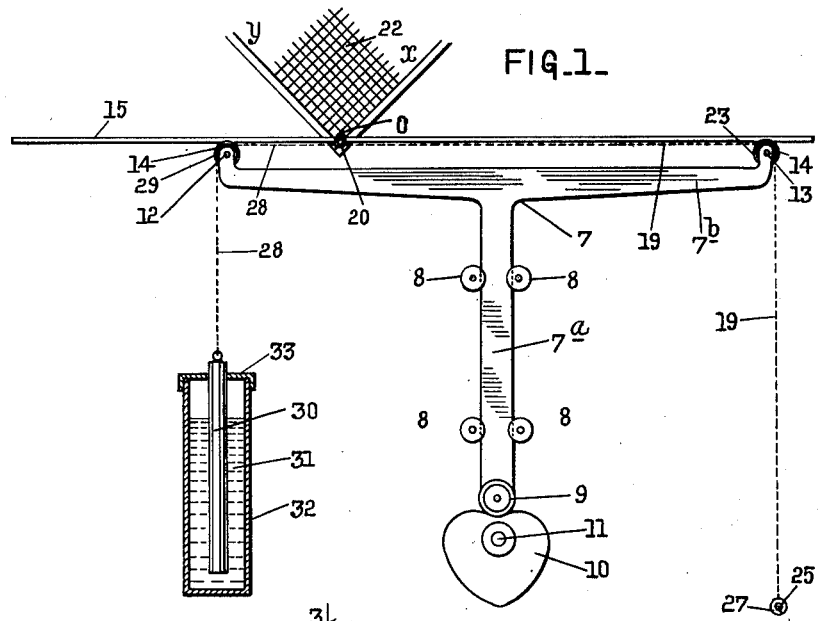
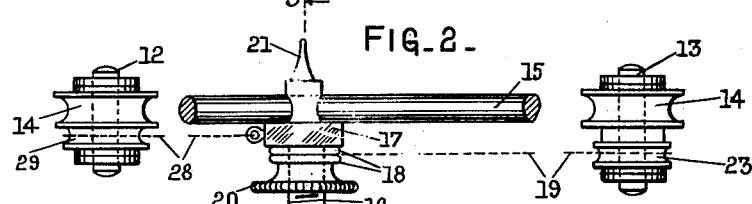
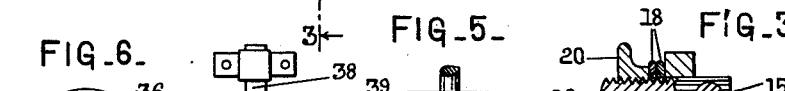
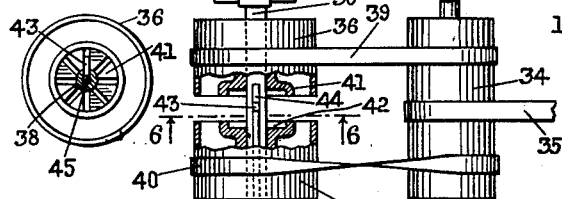
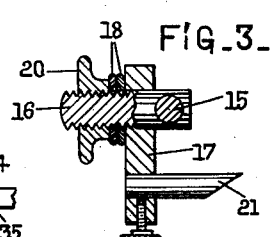
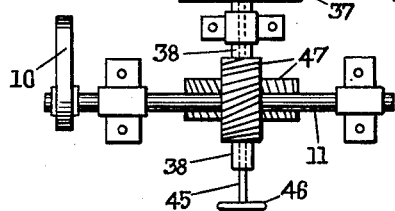
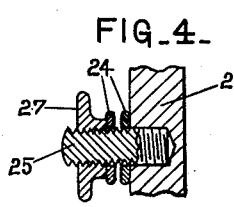
HENRY EWING
ROBERT P. ROBERTS
Inventors
Attorneys Patented Aug. 14, 1934

1,970,292

UNITED STATES PATENT OFFICE 1,970,292

FIBER TESTING APPARATUS

Henry Ewing and Robert Pierce Roberts, Spondon, near Derby, England, assignors to Celanese Corporation of America, a corporation of Delaware Application July 27, 1929, Serial No. 381,636
In Great Britain August 4, 1928

7 Claims. (Cl. 265—2)

This invention relates to apparatus for testing the strength of yarns, threads, fibers, filaments, wires, cords, and the like and has for its principal object to provide a new or improved apparatus for recording the stress-strain curves of yarns or the like under an applied load. A further object of the invention is to provide a new or improved apparatus whereby stress-strain curves may be recorded when yarns or the like are subjected to an increasing or a decreasing load or to a load which at first increases and then decreases, or vice-versa.

According to the invention, an apparatus for testing the strength of yarns, threads, fibers, filaments, wires, cords, and the like, comprises means for applying an increasing or decreasing load to a length thereof, one end of the length under test being fixed in relation to a record chart, and the other end being capable of movements relatively to the chart, which movements are proportional respectively to the applied load and to the extension of the length due to the applied load, and means for recording these movements as a stress-strain curve on the chart, which is preferably maintained stationary during the test. The length to be tested is preferably disposed so that the portions adjacent to its end are at a right-angle to each other.

The load may be applied or removed in any suitable way, but preferably in such a way that reversal of the loading can be secured at any point in the application of the load. Means may be provided to secure a repeated reversal of the loading. The load is preferably applied and/or removed at a constant rate. Conveniently, the load is provided by a weight connected to the yarn or the like and arranged to be suspended so that it can be removed from or placed into a liquid.

A cam or the like, driven manually or mechanically, may be used to apply or remove the load, and may be arranged to effect a repeated application and removal of the load. When a cam is employed, its surface or surfaces is or are arranged to give any desired rate of application or removal of the load; thus, for a constant rate, spiral or heart-shaped cams may conveniently be used.

According to a preferred embodiment of the invention, the apparatus comprises a frame carrying a horizontal bar or rod, movable lengthwise along the frame, pulleys on the frame, the one pulley receiving and guiding a length of yarn or the like to be tested, which yarn or the like is attached at one end to a point on the bar or rod, and at the other to a fixed point, and the other pulley receiving and guiding a flexible inextensible member attached at its ends to a point on the bar or rod, and to a floating weight or weights, means for imparting a vertical linear movement to the frame so as to apply an increasing or decreasing load to the yarn or the like, a stylus on the bar or rod, and a fixed record chart co-operating with the stylus whereby the movements of the stylus in accordance with the applied load and with the extension of the yarn or the like under the applied load are recorded as a stress-strain curve on the chart.

We will now describe with the aid of the accompanying drawing one form of testing apparatus according to the invention, but it is to be understood that the following description is given by way of example only and is not to be construed as in any way limitative.

Referring to the drawing:—

Fig. 1 is a front elevation in diagrammatic form of the principal parts of the apparatus;

Fig. 2 is a plan view of a part thereof;

Figs. 3 and 4 show details of parts of Figs. 1 and 2; and

Figs. 5 and 6 show a driving-mechanism for the load-applying means, Fig. 6 being a part-sectional view on the line 6—6 of Fig. 5.

In Figs. 1 and 2, 7 is a T-shaped frame, the vertical limb 7a of which is guided between rollers 8 and terminates in a cam-follower 9, the weight of the frame 7 being supported by a cam 10 mounted on a shaft 11. It will be seen that the frame 7 is capable only of linear movement in a vertical plane. The horizontal limb 7b of the frame 7 is forked at its ends to receive horizontal spindles 12, 13, on each of which a light grooved wheel 14 is free to turn. A rigid bar 15 is supported by the wheels 14 and adjustably secured thereto are means to which one end of the yarn or the like to be tested is attached, these means being clearly shown in Figs. 2 and 3.

A bolt 16 is arranged to slide on the bar 15 and passes through a block 17 and a pair of fiber or like discs 18. One end of the material 19 to be tested is placed between the discs 18 and a nut 20 on the bolt 16 is turned to clamp the material and at the same time to secure the block 17 rigidly to the bar 15. A stylus 21 is carried by the block 17 and is arranged to make a light contact with a record chart 22. The material 19 passes over a light pulley 23 on the spindle 13 and its other end is secured between fiber discs 24 carried by a stud 25 mounted in a fixed part 26 of the apparatus, as shown in Fig. 4. A nut 27 similar to the nut 20 is provided for clamping the discs 24 on to the end of the material. Alternatively, and preferably, the position of the stud 25 may be adjustable so that different lengths of material may be tested. It will be seen that the lengths of material between the stylus 21 and the pulley 23, and between the pulley 23 and the stud 25 respectively are at a right-angle one with the other.

Again referring to Figs. 1 and 2, an inextensible but flexible member, such as a chain 28, is attached to the block 17 and, passing over a light pulley 29 on the spindle 12, supports a weight 30 floating in liquid 31. Preferably, the vessel 32 containing the liquid is provided with a cover 33 to exclude dust etc., the weight 30 passing freely through a hole in the cover, but a disc may be secured to the weight for the same purpose. Conveniently, also, a film of oil may be formed on the surface of the liquid to prevent disturbance of the liquid level by evaporation.

The operation of the apparatus will now be briefly described. A length 19 of material to be tested, say yarn, is secured at its ends between the pairs of discs 18, 24, the length of the yarn or the position of the stud 25 being so adjusted that the weight 30 is just floating freely in the liquid 31, the cam 10 and the frame 7 being, of course, in their lowermost position. The weight 30 is suitably chosen according to the load desired to be applied or to the probable breaking load of the yarn. If necessary, an additional floating weight or weights may be suspended from the chain 28. With the weight 30 floating freely, the stylus 21 should be at the origin o of the chart 22, and for this purpose, the chart 22 may be adjustably mounted, as by the use of drawing pins.

On rotation of the cam 10, the frame 7 is raised, carrying with it the bar 15 and withdrawing the weight 30 from the liquid 31. A load corresponding to the amount of withdrawal of the weight is thus applied to the yarn 19 at a rate corresponding to the form of the cam 10 and the speed of its rotation, and a stress-strain curve will be recorded on the chart 22, the stylus partaking of a movement which is the resultant of its movement in a direction parallel to the co-ordinate $ox$ in accordance with the applied load and its movement in a direction parallel to the co-ordinate $oy$ in accordance with extension. It will be readily understood that the co-ordinates $ox$, $oy$ must be positioned at 45° to the horizontal.

The cam 10 may be rotated to any desired extent. For instance, it may be stopped when a predetermined load has been applied to the yarn, or it may then be reversed to remove the load. Alternatively, the cam may rotate until a breaking load has been applied. If, however, the load corresponding to the full lift of the cam is below the breaking load of the material, the cam may make a full rotation, thus applying the load and then removing it, and a continued rotation effects a repeated reversal of loading for as many times as desired.

The mechanism shown in Figs. 5 and 6 is a convenient arrangement for effecting any of the above-described loading and unloading operations. A pulley 34 driven in any suitable manner, e. g. by an electric motor, through a belt 35, drives pulleys 36, 37 loosely mounted on a hollow shaft 38 through open and crossed belts 39, 40 respectively. Clutch members 41, 42 formed or provided on the pulleys 36, 37 are arranged to be selectively engaged by a tooth 43 passing through a slot 44 in the shaft 38 and carried by a rod 45 sliding inside the shaft. A handle 46 on the rod 45 enables either of the pulleys 36, 37 to drive the shaft 38, or both of them to be disengaged. The shaft 38 is geared, preferably through worm or spiral gearing 47, to the shaft 11 carrying the cam 10. By means of this arrangement, the cam 10 may be driven to any extent in either direction and may be stopped whenever desired, but it will be understood that we do not confine ourselves to this arrangement, but may use any other suitable driving and reversing means.

What we claim and desire to secure by Letters Patent is:—

1. Apparatus for testing the strength of yarns, threads, fibers, filaments, wires, cords, and the like comprising a horizontally elongated frame, a bar mounted for movement lengthwise of the frame, means on said bar for holding one end of a length of material to be tested, a record chart, means fixed relatively to the chart for holding the other end of said material, loading means adapted to be attached to said bar, a stylus on the bar adapted to cooperate with the chart, and means for effecting relative movement between said frame and said chart to apply or remove said load to or from said bar, and thereby to or from the material, the movement of the stylus in accordance with the applied load and with the extension of the material under the applied load thus being recorded on the chart as a stress-strain curve.

2. Apparatus for testing the strength of yarns, threads, fibers, filaments, wires, cords, and the like comprising a horizontally elongated frame, a bar mounted for movement lengthwise of the frame, means on said bar for holding one end of a length of material to be tested, a record chart, means fixed relatively to the chart for holding the other end of said material, loading means including a vessel also fixed relatively to the chart and adapted to contain a liquid and a weight adapted to float in said liquid and to be attached to said bar, a stylus on the bar adapted to cooperate with the chart, and means for effecting relative movement between said frame and said chart to lift or lower the weight out of or into the liquid and thereby to apply a load to or remove a load from the material, the movement of the stylus in accordance with the applied load and with the extension of the material under the applied load thus being recorded on the chart as a stress-strain curve.

3. Apparatus for testing the strength of yarns, threads, fibers, filaments, wires, cords, and the like comprising a horizontally elongated frame, a bar mounted for movement lengthwise of said frame, means on said bar for holding one end of a length of material to be tested and normally fixed means for holding the other end of said material, loading means including a vessel adapted to contain a liquid and a weight adapted to float in said liquid and to be attached to said bar, means for imparting movement to said frame to lift or lower the said bar and weight and thereby apply a load to or to remove a load from said material, a stylus on said bar and a fixed record chart adapted to cooperate with said stylus whereby the movement of the stylus in accordance with the applied load and with the extension of the material under the applied load is recorded on said chart, as a stress-strain curve.

4. Apparatus for testing the strength of yarns, threads, fibers, filaments, wires, cords, and the like comprising a horizontally elongated frame, a bar mounted for movement lengthwise of said frame, means on said bar for holding one end of a length of material to be tested and normally fixed means for holding the other end of said material, loading means including a vessel adapted to contain a liquid and a weight adapted to float in said liquid and to be attached to said bar, cam means for imparting movement to said frame to lift or lower the said bar and weight and thereby apply a load to or to remove a load from said material, a stylus on said bar and a fixed record chart adapted to cooperate with said stylus whereby the movement of the stylus in accordance with the applied load and with the extension of the material under the applied load is recorded on said chart, as a stress-strain curve.

5. Apparatus for testing the strength of yarns, threads, fibers, filaments, wires, cords, and the like comprising a horizontally elongated frame, a bar mounted for movement lengthwise of the frame, means on said bar for holding one end of a length of material to be tested, a record chart, means fixed relatively to the chart for holding the other end of said material, loading means adapted to be attached to said bar, a stylus on the bar adapted to cooperate with the chart, means for effecting relative movement between said frame and said chart to apply or remove said load to or from said bar, and thereby to or from the material, and means for securing a reversal of the load at any point in the application thereof, the movement of the stylus in accordance with the applied load and with the extension of the material under the applied load being recorded on the chart as a stress-strain curve.

6. Apparatus for testing the strength of yarns, threads, fibers, filaments, wires, cords, and the like comprising a horizontally elongated frame, a bar mounted for movement lengthwise of said frame, means on said bar for holding one end of a length of material to be tested and normally fixed means for holding the other end of said material, loading means including a vessel adapted to contain a liquid and a weight adapted to float in said liquid and to be attached to said bar, means for imparting movement to said frame to lift or lower the said bar and weight and thereby apply a load to or remove a load from said material, said means being adapted to apply or remove the load at a constant rate, a stylus on said bar and a fixed record chart adapted to cooperate with said stylus whereby the movement of the stylus in accordance with the applied load and with the extension of the material under the applied load is recorded on said chart, as a stress-strain curve.

7. Apparatus for testing the strength of yarns, threads, fibers, filaments, wires, cords, and the like comprising a horizontally elongated frame, a bar mounted for movement lengthwise of said frame, means on said bar for holding one end of a length of material to be tested and normally fixed means for holding the other end of said material, loading means including a vessel adapted to contain a liquid and a weight adapted to float in said liquid and to be attached to said bar, cam means for imparting movement to said frame to lift or lower the said bar and weight and thereby apply a load to or remove a load from said material, means for driving said cam means, means in connection with said driving means adapted to secure a reversal of the load at any point in the movement of the cam means, a stylus on said bar and a fixed record chart adapted to cooperate with said stylus whereby the movement of the stylus in accordance with the applied load and with the extension of the material under the applied load is recorded on said chart, as a stress-strain curve.

HENRY EWING.
ROBERT PIERCE ROBERTS.